(12) United States Patent
Markham

(10) Patent No.: US 6,439,166 B1
(45) Date of Patent: Aug. 27, 2002

(54) ANIMAL TOY WITH RAISED FEATURES

(75) Inventor: Joseph P. Markham, Arvada, CO (US)

(73) Assignee: Bounce, Inc., Golden, CO (US)

( * ) Notice: Subject to any disclaimer, the term of this patent is extended or adjusted under 35 U.S.C. 154(b) by 4 days.

(21) Appl. No.: 09/586,135

(22) Filed: Jun. 2, 2000

(51) Int. Cl.$^7$ ............................................. A01K 29/00
(52) U.S. Cl. ....................... 119/710; 119/707; 119/709
(58) Field of Search ................................ 119/710, 709, 119/707; 606/235; D24/194; D30/160

(56) References Cited

U.S. PATENT DOCUMENTS

| | | | | |
|---|---|---|---|---|
| 2,610,851 A | * | 9/1952 | Jones | 119/710 |
| D256,958 S | * | 9/1980 | Markham | D30/160 |
| 4,802,444 A | | 2/1989 | Markham et al. | 119/29 |
| D308,122 S | | 5/1990 | Markham et al. | D30/160 |
| 5,263,436 A | * | 11/1993 | Axelrod | 119/710 |
| D344,161 S | | 2/1994 | Markham | D30/160 |
| D349,786 S | | 8/1994 | Markham | D30/160 |
| D373,859 S | * | 9/1996 | Markham et al. | D30/160 |
| 5,595,142 A | * | 1/1997 | Chill | 119/710 |
| 5,647,302 A | * | 7/1997 | Shipp | 119/709 |
| 5,832,877 A | | 11/1998 | Markham | 119/710 |
| 5,865,146 A | * | 2/1999 | Markham | 119/707 |
| 5,904,118 A | * | 5/1999 | Markham | 119/707 |
| 5,947,061 A | * | 9/1999 | Markham et al. | 119/710 |
| 6,098,571 A | * | 8/2000 | Axelrod et al. | 119/707 |
| 6,112,703 A | * | 9/2000 | Handelsman | 119/707 |
| 6,116,191 A | * | 9/2000 | Suchowski et al. | 119/709 |
| 6,202,598 B1 | * | 3/2001 | Willinger | 119/709 |
| 6,221,093 B1 | * | 4/2001 | Prince | 606/234 |

\* cited by examiner

Primary Examiner—Charles T. Jordan
Assistant Examiner—John W. Zerr
(74) Attorney, Agent, or Firm—Sheridan Ross P.C.

(57) ABSTRACT

An animal toy includes a plurality of raised features to enhance the dental cleaning action of the animal toy with the animal's mouth. The raised features may be made of varying shapes and designs. The animal toy may have a hollow core to further receive animal treats, or to receive a buoyant material allowing the animal toy to float. The animal toy can be made of desired resilient flexible material which enhances the dental cleaning. The raised features may be made in any desired format to include outline form and solid form. Furthermore, the raised features may have differing tips or ends which also have beneficial effects on the animal's mouth for dental cleaning.

13 Claims, 2 Drawing Sheets

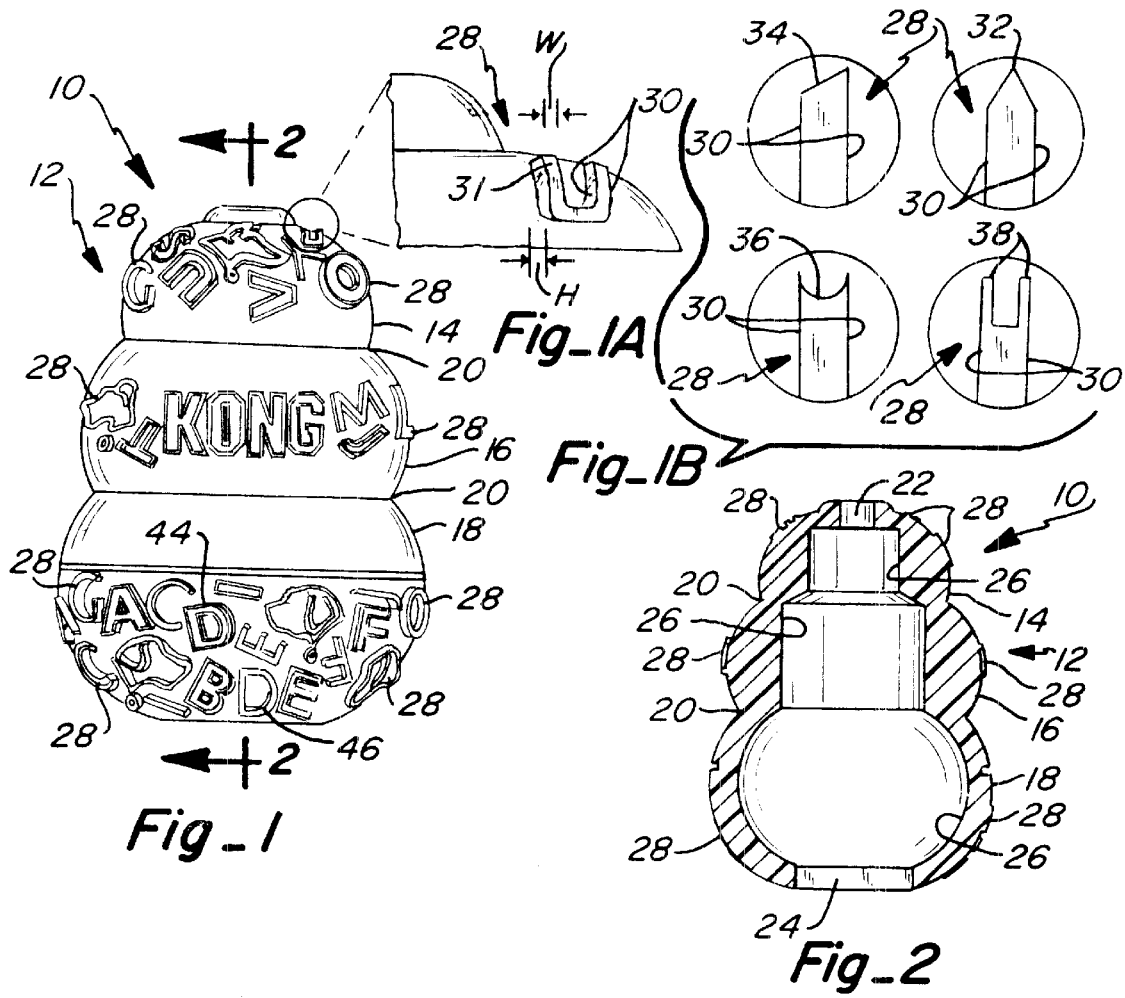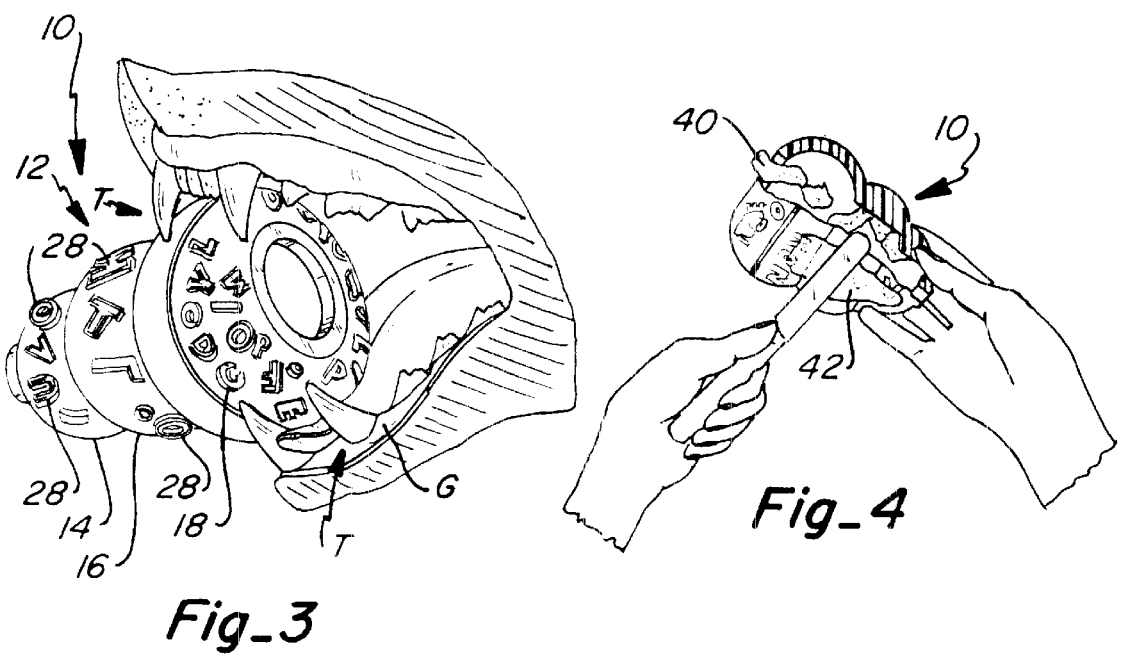

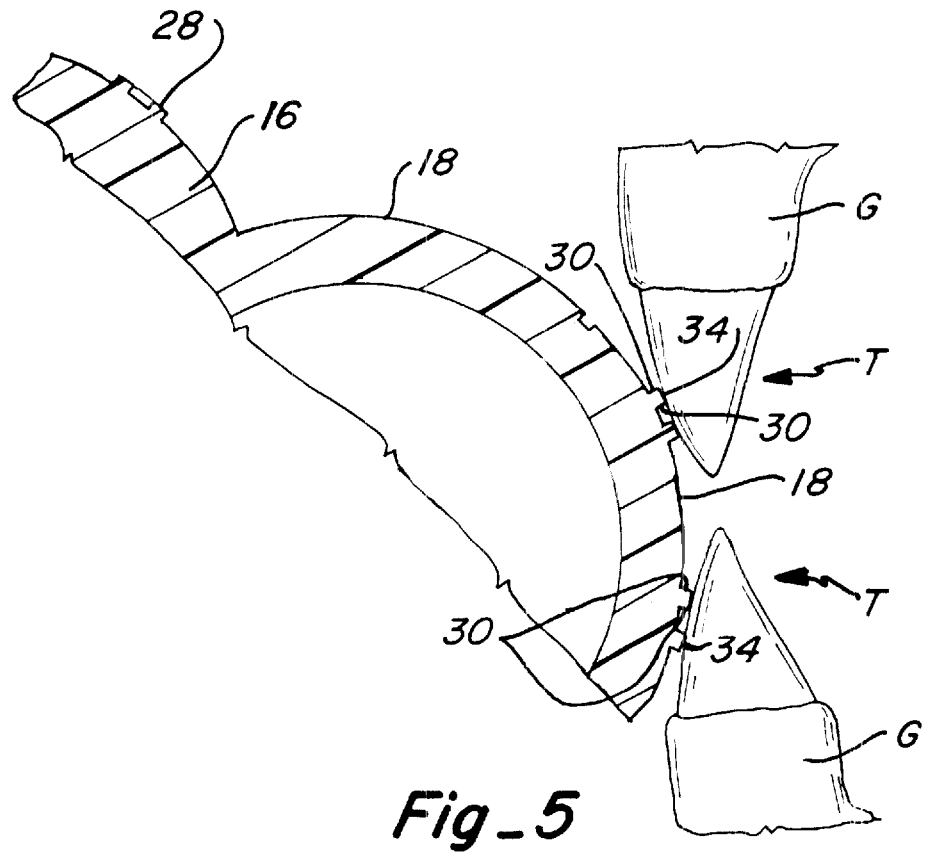
Fig_5
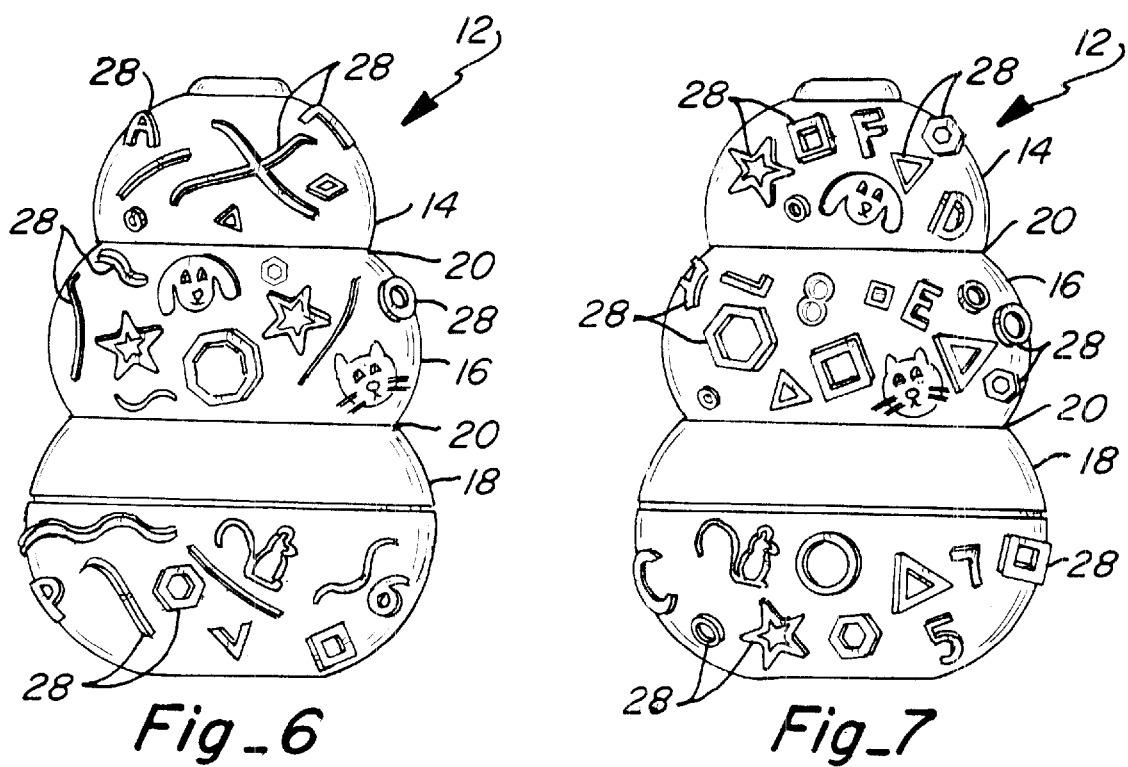
Fig_6  Fig_7

ANIMAL TOY WITH RAISED FEATURES

TECHNICAL FIELD

This invention relates to an animal toy and, more particularly, to an animal toy having a plurality of raised features on an outer surface of the animal toy which stimulates dental cleaning of the animal's teeth and gums, and further allows for treats to be placed on the raised features to encourage an animal's interaction with the animal toy.

BACKGROUND ART

Chewable pet toys have been available for many years. Many are impregnated with odors or flavoring materials which are attractive to the animal for which the toy is intended. These toys can be made of various materials, such as rawhide, rubber and plastic. The shortcoming of many of these products is that after a period of time, the flavor and/or odor becomes less strong and the animal loses interest in the toy. No means is provided for subsequently enhancing the flavor and odor of the toy.

Additionally, many toys which are impregnated with the odors or flavorings are not intended to be consumed by the animal. However, because of the stimulation provided to the animal, it may consume the entire pet toy which may cause the animal to choke or to experience fatal gastrointestinal problems by ingesting the toy.

Tay (U.S. Des. Pat. No. 188,179) discloses a pet food holder which has a hollow center for holding food.

Allis (U.S. Pat. No. 1,149,170); Jones (U.S. Pat. No. 260,851); and Edwards (U.S. Pat. Nos. 4,513,014 and 4,557,219) each disclose a pet toy having a flavoring material impregnated therein.

Fisher (U.S. Pat. No. 3,104,648) discloses a pet toy which is odor impregnated.

Markham (U.S. Pat. No. Re. 34,352) discloses a therapeutic pet toy having parallel peripheral grooves in which oral hygiene substances may be placed.

Axlerod (U.S. Pat. No. 3,871,334) and Miller (U.S. Pat. Nos. 3,899,607 and 4,032,665) each disclose pet toys which are both flavor and odor impregnated.

Jungle Talk International sells a product for birds made of wood which has openings in which nuts are firmly fixed. The bird must substantially destroy the wood in order to reach the nuts. Thus, the product cannot be reloaded and reused.

A product known as a "Buster Cube" has an opening in which dry dog food is poured. As a dog knocks it over in playing with it, the food runs out so that the dog can eat it.

Although each of these inventions is suitable for its intended purpose, none provides means on the exterior or outer surface thereof for holding animal treats to help keep the animal interested in the toy. Furthermore, most of them do not provide adequate dental cleaning of the animal's mouth.

DISCLOSURE OF THE INVENTION

In accordance with the present invention, an animal toy is provided having a plurality of raised features formed on the outer surface thereof. The raised features may include different types of tips or ends which have beneficial dental cleaning effects. Some of the variations of the tips or ends include tapered tips, beveled tips, crescent-shaped tips, dual-tipped tips, and flat top tips. The animal toy has many benefits to an animal which chews on the animal toy. First, the raised features provide for a multitude of different contact surface which allows the gums and teeth of the animal to be cleaned while chewing on the toy. Second, the raised features allow food treats to be placed on and around the raised features which further enhances an animal's desire to chew on the animal toy.

The animal toy is made of a resilient flexible material which prevents it from being destroyed when chewed on by the animal. Therefore, treats can be replaced as desired in the animal toy without having to also replace the animal toy. The resilient flexible material also provides options for determining how hard an animal must bite down on the animal toy or otherwise deform the animal toy in order to dislodge a treat. The primary dental cleaning occurs when the teeth and gums of the animal contact the raised features. The raised features are bent or deflected as they contact the teeth and gums of the animal. The raised features can be made more or less rigid, thus resulting in the desired amount of deflection as the animal's mouth comes into contact with the raised features. It is also contemplated within the spirit and scope of this invention that the degree of resiliency of the material making up the animal toy can be varied to achieve the desired effect on the animal's mouth for dental cleaning and also to achieve the desired effect for occupying the animal while the animal attempts to remove treats. In the preferred embodiment of the invention, the animal toy is in the shape of the well-known KONG® toy having three stacked layers or sections, and a hollow core. The basic KONG® toy is manufactured and sold by Bounce, Inc. d/b/a The Kong Company, Golden, Colo.

Although the KONG® toy is shown in the preferred embodiment, it shall be understood that the raised features of the present invention can be used on any shaped animal toy in order to achieve dental cleaning and to allow treats to be placed on and between the raised features to keep an animal occupied.

The raised features are formed on the outer surface of the animal toy. Preferably, they extend perpendicularly away from the outer surface. In the case of the KONG® toy, since it has rounded or curved surfaces, the raised features extend away from the outer surface of the animal toy in a multitude of different angles. These multitude of different angles in which the raised features extend enhance the cleaning action of the animal toy with regard to the animal's mouth as there is an increased chance that one or more of the raised features will contact different tooth and gum surfaces of the animal's mouth.

The raised features may be of many different shapes and designs. In the preferred embodiment, the raised features are in the form of letters and animal profiles such as dogs. For the letters, they may be in solid form, or in outline form wherein the letter is formed such that it has a double outline configuration. It is known that some pet toy manufacturers place their company names on their pet toys, and some of the names may be in the form of raised letters. However, the use of the company names are not capable of achieving any worthwhile dental cleaning as the letters are typically less than 0.05 inches in height, and there are not enough letters to provide an irregular massed pattern which effectively present sufficient edged surfaces for cleaning. In addition to the raised features in the form of letters and animal profiles, it is also contemplated within the spirit and scope of this invention that the raised features can be any desired shape or design. For example, the raised features could also include geometric shapes such as triangles, squares, rectangles and the like. Additionally, the raised features could include a plurality of elongated lines which traverse the animal toy, and further could intersect at various locations along the outer surface of the animal toy. Any of these raised feature examples could be used alone or in combination with one another. Furthermore, these raised features can be in solid form or in outline form such that each of the raised features has a double outline configuration.

Another way in which to describe the raised features is in terms of an array or pattern of designs and shapes. The pattern or array is applied to a preferably curved outer surface of an animal toy wherein the curvature extends in different planes and directions. The curved surface can also be described as a compound surface because the shape of the toy is not simply cylindrical, but rather, it has multiple rounded features. By applying raised features on such a curved surface, the raised features, therefore, extend away from the curved surface at a number of different angles. Thus, an animal contacting the raised features which extend away at such varying angles further ensures more complete and thorough cleaning of the animal's mouth.

The term "treat" as used herein is intended to include any items which are attractive to or consumed by an animal. Thus, treats might include edible materials such as canned pet food otherwise known as wet pet food, or other types of paste-like animal treats which can be spread on the outer surface of the animal toy and which can adhere to the outer surface and be held thereto by the raised features. Treats could also include peanut butter, or therapeutic material such as dog toothpaste or other dental treats. As the animal chews on the animal toy, use of the treats further enhances the animal's interaction with the animal toy such that an increased number of the animal's gum and tooth surfaces come into contact with the animal toy for dental cleaning. It is also contemplated within the spirit and scope of this invention that treats can be placed in the hollow core of the animal toy, such as dry pet food. These treats can be wedged in the hollow core which makes it more difficult for the animal to extract the treats. Because some treats will be more difficult for the animal to remove than others when placed in the hollow core, the animal can be kept occupied for several hours before treats need to be replaced. Although the preferred embodiment shows a hollow core, it is also within the spirit and scope of this invention that the animal toy could be solid without a hollow core. Alternatively, it is also contemplated that the animal toy of this invention may be filled with a material enabling the animal toy to float. For example, a buoyant Styrofoam=200 like material could be placed within the hollow core of the animal toy in order to allow the animal toy to float. Such a buoyant material could be sized to still allow various treats to be placed within the hollow core.

Additional advantages will become apparent from the description which follows, taken in conjunction with the accompanying drawings.

BRIEF DESCRIPTION OF THE DRAWINGS

FIG. 1 an elevational view of the preferred embodiment of the animal toy of this invention. FIG. 1A illustrates an enlarged fragmentary elevational view of a portion of the animal toy which better shows a raised feature. FIG. 1B further shows four greatly enlarged illustrations of the various types of raised features which may be incorporated within the animal toy of this invention;

FIG. 2 is a vertical section taken along line 2—2 of FIG. 1;

FIG. 3 is a perspective view of the animal toy of this invention as an animal such as a dog is biting down on the animal toy;

FIG. 4 is a fragmentary perspective view of the animal toy of this invention showing a paste-like treat being spread on the outer surface of the animal toy, and further showing treats placed within the hollow core of the animal toy;

FIG. 5 is a greatly enlarged fragmentary perspective view of the animal toy of this invention showing raised features which contact the teeth and gums of the animal; and FIGS. 6 and 7 are fragmentary perspective views of the animal toy showing additional types of raised features that may be incorporated on the outer surface thereof.

DETAILED DESCRIPTION OF THE DRAWINGS

In accordance with this invention, an animal toy in a preferred embodiment is shown at FIG. 1. The animal toy 10 has an outer surface 12 with a plurality of raised features 28 formed thereon. The overall shape of the animal toy 10 in FIG. 1 is that of the well-known KONG® animal toy. Accordingly, the animal toy 10 has an upper end layer or section 14, a middle layer or section 16, and a lower layer or section 18. The layers/sections 14, 16 and 18 are separated by delineations 20. Each section has curved surfaces which can also be described as compound curved surfaces considering that the toy exists in three dimensions. As best seen in FIG. 2, the animal toy has a hollow core defined by a pair of opposed end openings 22 and 24, and an inner side wall 26.

FIGS. 1A and 1B illustrate a number of different types of tips or ends which may be utilized with the raised features 28. As shown in FIG. 1A, each raised feature 28 has a pair of opposed and substantially parallel side walls 30 which extend substantially perpendicular away from the outer surface of the animal toy. In the case of FIG. 1A, the side walls 30 terminate with a flat top tip 31. As shown in the FIG. 1B, the raised features 28 may terminate with a number of other types of tips or ends which each have benefits for dental cleaning. As shown, some of the variations of the tips or ends of the raised features 28 include a tapered tip 32, a beveled tip 34, a crescent-shaped tip 36, and a dual-tipped tip 38.

As shown in FIG. 4, a solid food treat such as dog biscuits 40 may be placed within the hollow core of the animal toy. Alternatively or in conjunction with food treats 40, a paste-like food treat 42 may be spread over the outer surface of the animal toy.

As shown in FIGS. 1 and 3, the raised features may include letters or profiles of animals. Furthermore, the raised features may be constructed in an outline form or a solid form. Once example of the outline form is shown by reference number 44 illustrating the letter "D" having a double outline configuration. Alternatively, the letter "D" can also be made in solid form, as shown by reference number 46, wherein there is a single raised feature of a greater width.

In order to best achieve dental cleaning, there are some preferable ranges for the height and width of the raised features 28. It has been found that raised features which extend beyond 0.15 of an inch away from the outer surface of the animal toy can be too easily bit or torn off by the animal. Furthermore, raised features extending beyond 0.15 of an inch may not achieve optimal dental cleaning as such features have too much deflection and are not stiff enough to handle the biting action of the animal. Of course, a raised feature even at such longer lengths can be made extremely stiff depending upon the selection of the material; however, such longer raised features can damage the animal's teeth and gums if they are too stiff. It has been found that an optimal height H of a raised feature falls in the range of 0.075 to 0.15 of an inch. As shown in FIG. 1A, the height H is the distance a raised feature extends above the surface of the animal toy.

For the width of the raised surfaces, it has also been found that an optimal width to achieve dental cleaning is in the range of 0.05 to 0.125 of an inch. As also shown in FIG. 1A, the width W is the distance between the side walls 30 of any particular raised feature 28. Some deflection of the raised features 28 is desirable when the animal chews on the animal toy. Such deflection is shown in FIG. 5. Some deflection of the raised outer feature 28 allows the raised outer features to better massage the animal's teeth and gums, and also to deflect into the tight spaces between the teeth and gums which are normally difficult to reach. Although the above ranges have been provided for the height and width, it shall be understood that this invention is not strictly limited by these ranges because there still can be some dental cleaning benefits for raised features falling out of these ranges depending upon the type of material used to make the animal toy, and the curved outer surface of the animal toy.

In addition to an optimal range for the height H and width W of the raised features 28, it has also been found that there is a optimal height to width ratio for the raised features 28. When the raised features are made of a resilient flexible material which allows them to adequately deflect by the biting action of an animal, it is desirable to have a height to width ratio of at least 2 to 1. Accordingly, the height of any raised feature preferably is at least twice the width of the raised feature. This ensures that the raised feature will deflect, and further that the raised feature will be long enough so that it can massage the tight spaces between the teeth and gums of the animal. Although the at least 2 to 1 ratio is preferable, there are still beneficial effects for use of raised features which have a height to width ratio of less than 2 to 1, and it shall be understood that this invention is not limited to this preferred ratio.

In addition to raised features 28, it is also contemplated within the spirit and scope of this invention that the raised features could be formed in reverse manner such that they are inset or recessed below the outer surface of the animal toy. In this case, it is also desirable for the inset or recessed features to be within the 0.075 to 0.15 of an inch range in terms of depth below the surface of the animal toy, as well as having a width which is also in the desired range of 0.05 to 0.125 of an inch.

The animal toy of this invention can be made of a resilient flexible material which prevents the animal toy from being consumed by the animal, and also helps to achieve the desired type of dental cleaning action in the animal's mouth. The animal toy can be made of a material flexible enough so that when the animal bites down on the animal toy, the actual side wall or outer surface of the animal toy is allowed to deform or deflect, along with the deflection of the raised surfaces. The animal toy may be made of a flexible plastic or rubber material which achieves this desired type of cleaning action.

As shown in FIGS. 3 and 5, perhaps the most efficient cleaning action achieved by the animal toy of this invention is when the animal bites on either end of the animal toy, and the raised features slide along the animal's teeth T and gums G in repetitive fashion, thus maximizing the dental cleaning effect.

As shown in FIGS. 6 and 7, in addition to the raised features illustrated above, differing combinations of other types of raised features 28 are shown. For example, FIG. 6 illustrates a combination of raised features including spaghetti-like patterns, geometric shapes, outline forms of a dog head, a cat head, and an outline of a mouse. FIG. 7 shows yet another combination of these raised features. By providing a scattered and random pattern of raised features which have varying shapes and configurations, the animal toy is better capable of cleaning the surfaces of the animal's teeth and gums because the raised surfaces protrude from the curved surfaces of the animal toy in a multitude of angles.

From the foregoing, the advantages of the present invention are readily apparent. An animal toy is provided which has a plurality of raised features for dental cleaning of the animal's mouth. Because of the curved shape of the animal toy, the raised features which protrude therefrom contact multiple surfaces of the animal's teeth and gums, thereby enhancing the overall dental cleaning action of the animal toy. Furthermore, the use of animal treats in the animal toy enhances the ability of the toy to keep an animal occupied for extended periods of time.

This invention has been described in detail with reference to a particular embodiment thereof, but it will be understood that various other modifications can be effected within the spirit and scope of this invention.

What is claimed is:

1. An animal toy comprising:
a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and
said tip being tapered and extending between said side walls.

2. An animal toy comprising:
a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and
said tip being beveled and extending between said side walls.

3. An animal toy comprising:
a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and
said tip being dual-tipped and extending between said side walls.

4. An animal toy comprising:
a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and said tip being crescent-shaped and extending between said side walls.

5. An animal toy comprising:

a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and said at least one raised feature has a height extending beyond said outer surface of between about 0.075 and about 0.15 inches.

6. An animal toy comprising:

a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and said at least one raised feature has a width of between about 0.05 and 0.125 inches.

7. An animal toy comprising:

a body member having an outer surface, and a plurality of raised features formed on said outer surface, at least of one said raised features having a pair of side walls, and a tip defining a distal end of said at least one raised feature, said body member being made of a substantially homogeneous resilient material, and said plurality of raised features being deformable in response to the biting action of an animal which contacts said animal toy; and said at least one feature has a height to width ratio of at least 2 to 1.

8. A method of providing dental cleaning for the teeth and gums of an animal, said method comprising the steps of:

providing a body member having a compound outer surface, a plurality of raised features formed on the outer surface, at least one of said raised features having side walls, and a tip defining a distal end of the at least one raised feature, the body member being made of a substantially homogeneous resilient material, and said plurality of raised features being deformable in response to the biting action of an animal which contacts the animal toy;

providing the resiliency of the plurality of raised features to best accommodate a desired cleaning action;

providing the height of the side walls of the at least one raised feature to best accommodate the desired cleaning action; and providing the at least one raised feature with a height between about 0.075 and about 0.15 inches.

9. A method, as claimed in claim 8, further including the step of:

providing the tip being selected from the group consisting of a flat top tip, a tapered tip, a beveled tip, a dual-tipped tip, or a crescent shaped tip.

10. A method, as claimed in claim 8, further including the step of:

applying a paste like animal treat to the outer surface between said raised features to stimulate the animal.

11. A method, as claimed in claim 8, further including the step of:

providing the raised features in a random pattern on the outer surface.

12. A method, as claimed in claim 8, further including the step of:

providing the at least one raised feature with a width of between about 0.05 and 0.125 inches.

13. A method, as claimed in claim 8, further including the step of:

providing the at least one raised feature with a height to width ratio of at least 2:1.

* * * * *